(12) United States Patent
Kim

(10) Patent No.: US 8,606,183 B2
(45) Date of Patent: Dec. 10, 2013

(54) METHOD AND APPARATUS FOR REMOTE CONTROLLING BLUETOOTH DEVICE

(75) Inventor: Wan Gyu Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 142 days.

(21) Appl. No.: 12/944,965

(22) Filed: Nov. 12, 2010

(65) Prior Publication Data

US 2011/0117851 A1 May 19, 2011

(30) Foreign Application Priority Data

Nov. 18, 2009 (KR) ........................ 10-2009-0111326

(51) Int. Cl.
*H04B 5/00* (2006.01)
(52) U.S. Cl.
USPC ........................ 455/41.3; 455/41.2
(58) Field of Classification Search
USPC .......... 455/41.1–41.3, 569.1, 575.3; 370/225, 370/359; 704/275; 726/1
See application file for complete search history.

(56) References Cited

U.S. PATENT DOCUMENTS

| 8,099,289 | B2* | 1/2012 | Mozer et al. ................. 704/275 |
| 2009/0176452 | A1* | 7/2009 | Hillyard ..................... 455/41.2 |
| 2009/0187967 | A1* | 7/2009 | Rostaing et al. ................ 726/1 |
| 2010/0041335 | A1* | 2/2010 | Hsu et al. .................... 455/41.2 |
| 2010/0069007 | A1* | 3/2010 | Nagasawa ................... 455/41.3 |
| 2010/0195539 | A1* | 8/2010 | Tian et al. ................... 370/255 |

* cited by examiner

*Primary Examiner* — Ping Hsieh
*Assistant Examiner* — Chung-Tien Yang
(74) *Attorney, Agent, or Firm* — Jefferson IP Law, LLP

(57) ABSTRACT

An apparatus and a method for remote control of a Bluetooth device are provided. The method includes establishing a Bluetooth connection with a Bluetooth headset, generating virtual media stream data during execution of an application, establishing a virtual media streaming connection with the Bluetooth headset based on the generated virtual media stream data, recognizing a control signal received from the Bluetooth headset as a control event after the establishing of the virtual media streaming connection, and controlling a function of the executed application according to the control event.

20 Claims, 6 Drawing Sheets

METHOD AND APPARATUS FOR REMOTE CONTROLLING BLUETOOTH DEVICE

PRIORITY

This application claims the benefit under 35 U.S.C. §119(a) of a Korean patent application filed on Nov. 18, 2009 in the Korean Intellectual Property Office and assigned Serial No. 10-2009-0111326, the entire disclosure of which is hereby incorporated by reference.

BACKGROUND OF THE INVENTION

1. Field of the Invention

The present invention relates to an apparatus and method for remotely controlling a Bluetooth device. More particularly, the present invention relates to an apparatus and method for remotely controlling a Bluetooth device executing an application function other than a media data playing application based on Audio Video Remote Control Profile (AVRCP).

2. Description of the Related Art

In recent years, with the rapid development of electronic technology, more and more advanced functions are being provided in a mobile device. For example, mobile devices are now provided with a Bluetooth function supporting Bluetooth communication. The mobile device supporting the Bluetooth function allows for remotely controlling call execution functions as well as listening to music by a Bluetooth headset.

A conventional Bluetooth Stereo Headset is able to remotely control functions of a media player in a Bluetooth device using an Advanced Audio Distribution Profile (A2DP) and an Audio Video Remote Control Profile (AVRCP). For example, in a state in which a Bluetooth connection is established between the Bluetooth device and the Bluetooth Stereo Headset, the Bluetooth device may play media data. In this state, the Bluetooth device may play media data and form a streaming audio or video connection state between the Bluetooth device and the Bluetooth stereo headset.

In a state in which the streaming audio or video connection is established, an AVRCP control signal, generated by the Bluetooth stereo headset, may be transmitted to the Bluetooth device. When the Bluetooth device receives the AVRCP control signal during the streaming audio or video operation, it controls a media playing function based on the received control signal. Accordingly, the related art supports AVRCP based remote control with respect to media data played in the Bluetooth device during a streaming audio or video connection state between the Bluetooth device and the Bluetooth headset.

However, the Bluetooth device of the related art cannot support remote control of data that is executed based on an application that does not play audio or video data. Namely, when the Bluetooth device receives a remote control signal from a Bluetooth stereo headset using A2DP and AVRCP while an application other than an application that plays an audio or video streaming operation is executed, it disregards the corresponding control signal. Accordingly, the Bluetooth stereo headset does not generally transmit an AVRCP based control signal to the Bluetooth device although a user request occurs when the Bluetooth stereo headset is not in the media streaming connection state. As a result, the related art does not support AVRCP based remote control with respect to another application function of the Bluetooth device.

SUMMARY OF THE INVENTION

An aspect of the present invention is to address at least the above-mentioned problems and/or disadvantages and to provide at least the advantages described below. Accordingly, an aspect of the present invention is to provide a method that may support remote control of a Bluetooth device using a Bluetooth headset supporting an Audio Video Remote Control Profile (AVRCP) remote control function, and an apparatus thereof.

Another aspect of the present invention is to provide a method for setting a virtual media streaming connection with a Bluetooth headset supporting an AVRCP remote control function, and a Bluetooth device supporting the same.

Yet another aspect of the present invention is to provide an apparatus and method for remotely controlling a Bluetooth device that may form a virtual media streaming connection state with a Bluetooth stereo headset to support remote control of the Bluetooth device during execution of an application in which the Bluetooth device does not perform a media streaming operation.

In accordance with an aspect of the present invention, a remote control method of a Bluetooth device is provided. The method includes establishing a Bluetooth connection with a Bluetooth headset, generating virtual media stream data during execution of an application, establishing a virtual media streaming connection with the Bluetooth headset based on the generated virtual media stream data, recognizing a control signal received from the Bluetooth headset as a control event after the establishing of the virtual media streaming connection, and controlling a function of the executed application according to the control event.

In accordance with another aspect of the present invention, a remote controlling apparatus of a Bluetooth device is provided. The method includes a Bluetooth module for establishing a Bluetooth connection with a Bluetooth headset, and a controller for establishing a virtual media streaming connection setting with the Bluetooth headset based on a generated virtual media stream data during execution of an application, and for processing a control signal received in a virtual media streaming connection state as an Audio Video Remote Control Profile (AVRCP) based control event.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
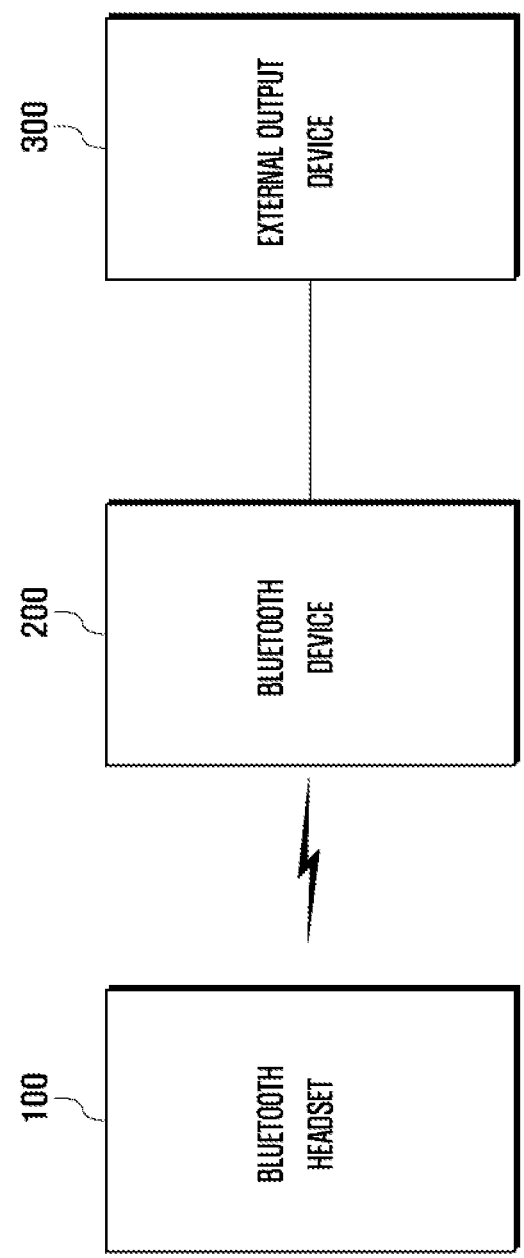
FIG. 1 is a block diagram schematically illustrating a configuration of a system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to an apparatus and method for controlling various functions of a Bluetooth device using Advanced Audio Distribution Profile (A2DP) and Audio Video Remote Control Profile (AVRCP) based profiles among Bluetooth profiles. Furthermore, exemplary embodiments of the present invention provide for the remote control of functions of a Bluetooth device based on AVRCP through a virtual audio or video streaming (hereinafter, referred to as 'media steaming') connection between the Bluetooth device and a Bluetooth stereo headset.

In an exemplary embodiment of the present invention, although the Bluetooth device is not in a media streaming operation state, it may virtually set a media streaming connection with the Bluetooth headset. The Bluetooth device may also generate virtual media stream data and periodically transmit the generated virtual media stream data to the Bluetooth headset according to a preset period, thereby setting the virtual media streaming connection. Through this connection, the Bluetooth device may receive a remote control signal based on A2DP and AVRCP from the Bluetooth headset, and control functions of applications executed in the Bluetooth device based on the received remote control signal.

Accordingly, exemplary embodiments of the present invention may support remote control with respect to various functions of a Bluetooth device not in a media streaming operation state using a Bluetooth stereo headset supporting A2DP and AVRCP.

For example, an exemplary embodiment of the present invention may provide for remotely controlling a function such as a screen conversion with respect to an internal output screen of the Bluetooth device or an external output screen of an external output device through a virtual media streaming connection between the Bluetooth device and a Bluetooth stereo headset. Exemplary embodiments of the present invention may enhance the convenience of a user based on the ability to remotely control a function executed by the Bluetooth device.

Hereinafter, a method for remotely controlling a Bluetooth device using Bluetooth communication, a Bluetooth device, and a system supporting the same, according to exemplary embodiments of the present invention, will be described. However, because a device and a control method thereof of the present invention are not limited to following contents, they are applicable to various embodiments based on following description.

FIG. 1 is a block diagram schematically illustrating a configuration of a system according to an exemplary embodiment of the present invention.

Referring to FIG. 1, the system includes a Bluetooth headset 100 and a Bluetooth device 200.

Each of the Bluetooth headset 100 and the Bluetooth device 200 includes a Bluetooth module and is constructed so as to provide a Bluetooth Headset Profile, Advanced Audio Distribution Profile (A2DP), and Audio Video Remote Control Profile (AVRCP). In an exemplary implementation, the system of the present invention may further include an external output device 300 accessing the Bluetooth device based on a wired or wireless interface.

The Bluetooth headset 100 may include a Bluetooth module, a speaker, a microphone, a display unit, an input unit, and the like, none of which are illustrated merely for sake of convenience. When a Bluetooth connection is established between the Bluetooth headset 100 and the Bluetooth device 200, the Bluetooth headset 100 may transmit and receive an audio signal and a control signal through Bluetooth communication with the Bluetooth device 200. For example, the Bluetooth headset 100 may output an audio signal received from the Bluetooth device 200, and transmit an audio signal input through the microphone to the Bluetooth device 200. Further, the Bluetooth headset 100 may generate a control signal based on input received via buttons of the input unit, and transmit the generated control signal to the Bluetooth device 200.

More particularly, the Bluetooth headset 100 supports the A2DP and the AVRCP. Accordingly, the Bluetooth headset 100 forms an A2DP and an AVRCP based media streaming connection based on streaming audio or video data (referred to as 'media stream data' hereinafter) generated and transmitted according to the playing of audio or video data (referred to as 'media data' hereinafter) by the Bluetooth device 100. Moreover, the Bluetooth headset 100 may remotely control functions associated with the playing of media data by the Bluetooth device 200 according to the media streaming connection.

The A2DP represents a profile (media streaming between Bluetooth devices) for wireless transmission of a stereo audio signal, and the AVRCP represents a profile for remote control of media (e.g., next music/previous music/play/pause, etc.).

In general, a Bluetooth headset can be provided as a mono headset or a stereo headset. The mono headset is a Bluetooth headset supporting a Headset Profile (HSP) and a Hands-Free Profile (HFP), and supports only a general call function. The stereo headset is a Bluetooth headset supporting HSP, HFP, A2DP, and AVRCP, supporting a call function, and providing an audio signal of high quality. In other words, the HSP and HFP are profiles used for playing an audio signal, and the A2DP and AVRCP are profiles used for listening to music based on an audio signal of high quality corresponding to the playing of an audio or a video file. Hereinafter, the stereo headset will be described as a representative example of the Bluetooth headset 100 according to an exemplary embodiment of the present invention.

The Bluetooth device 200 includes a display means for displaying an execution screen based on an application executed according to a user request and a Bluetooth module for Bluetooth communication. The Bluetooth device 200 may include all kinds of information and communication devices, multimedia devices, such as a portable terminal having a small display means and a display device having a large display means, and application devices with respect thereto.

If the Bluetooth device 200 includes a portable terminal, the portable terminal may include a Portable Multimedia Player (PMP), a digital broadcast player, a Personal Digital Assistant (PDA), a music player (e.g., Moving Picture Experts Group (MPEG) Audio Layer III (MP3) player), a portable game terminal, a wired or wireless telephone, a Smart Phone, and applications thereof as well as all mobile communication terminals operating based on communication protocols corresponding to various communication systems. The display device may include devices such as a Television (TV), a Large Format Display (LFD), Digital Signage (DS), a media pole, a Personal Computer (PC), a Notebook computer, and the like. Furthermore, the display means may include various display devices such as a Liquid Crystal Display (LCD), a Plasma Display Panel (PDP), Organic Light Emitting Diodes (OLED), and the like.

When the Bluetooth connection is established between the Bluetooth device 200 and the Bluetooth headset 100, the Bluetooth device 200 may transmit and receive an audio signal, and receive a control signal through Bluetooth communication with the Bluetooth headset 100. For example, the Bluetooth device 200 may transmit an audio signal according to the playing of media data or receipt of an audio signal, received from a partner's device as part of a voice call, to the Bluetooth headset 100, and output an audio signal received from the Bluetooth headset 200 through an internal speaker. Moreover, the Bluetooth device 200 may control functions during playback of media data such as the volume of currently played media data, the playing of previous or next media data, the rewinding, fast forwarding, pausing and playing of media data, and the like, based on a control signal received from the Bluetooth headset 100. The Bluetooth device 200 may receive an AVRCP based control signal in a media streaming connection state with the Bluetooth headset 100. Namely, when the Bluetooth device 200 is in a media streaming operation state, it may receive the control signal from the Bluetooth headset 100.

More particularly, in a state in which a Bluetooth connection is established between the Bluetooth device 200 and the Bluetooth headset 100, when an application that does not use an audio or video streaming operation is executed, the Bluetooth device 200 generates virtual media stream data. The Bluetooth device 200 transmits the virtual media stream data to the Bluetooth headset 100 according to a preset period. Accordingly, the Bluetooth device 200 may set an A2DP based media streaming connection with the Bluetooth headset 100 and receive an AVRCP based remote control signal from the Bluetooth headset 100. Generation and/or transmission of a control signal for remotely controlling an application other than a media data execution application is referred to as a 'control event' that is described below in more detail. Further, the Bluetooth device 200 may control functions of the other application in response to the control event.

For example, a conventional Bluetooth headset cannot transmit an AVRCP based control signal if it is not in a media streaming state. Accordingly, the Bluetooth device 200 may not remotely control, as an example, conversion of image data, provided according to execution of an album application, using the Bluetooth headset 100. However, an exemplary embodiment of the present invention may set the virtual media streaming connection so as to provide the ability to remotely control the conversion of a screen output from the Bluetooth device 200. That is, the functions of the Bluetooth device 200 may be remotely controlled, such as the conversion of album application based image data, the presentation of application based page conversion, the continuous viewing of image data or pages, and the like, according to a control event received from the Bluetooth headset 100 through the virtual media streaming connection.

The external output device 300 may access the Bluetooth device 200 based on a wired or wireless interface, so that the Bluetooth device 200 outputs a screen of certain data (e.g., image data, document data, photograph data, broadcasting data, etc.) to be transmitted. The external output device 300 may include a display device for performing a screen output based on data provided from the Bluetooth device 200. For example, the external output device 300 may include a TV, a DS, an LFD, a monitor, and the like. A more detailed description of the external output device 300 is omitted herein for sake of convenience.

The Bluetooth device 200 may include an interface unit based on a wired or wireless interface for accessing the external output device 300. When the Bluetooth device 200 includes an arrangement such as a project module with an external output function, the interface unit and the external output device 300 can be omitted from the system of the present invention.

As mentioned above, exemplary embodiments of the present invention may set a virtual media streaming connection between Bluetooth devices (e.g., Bluetooth headset 100 and Bluetooth device 200). Moreover, exemplary embodiments of the present invention may provide for the remote control of functions with respect to applications executed by the Bluetooth device 200 through the virtual media streaming connection using a Bluetooth headset 100 supporting an AVRCP based RCP. For example, exemplary embodiments of the present invention may support remote control with respect to screen conversion output through a display unit in the Bluetooth device 200 or the external output device 300.

A configuration of the Bluetooth device 200 according to an exemplary embodiment of the present will be described when the Bluetooth device 200 is a portable terminal. However, because a configuration of the Bluetooth device 200 of the present invention is not limited to the following, it should be understood that the configuration thereof is applicable to various embodiments based on following description.

Hereinafter, a general description of a Bluetooth device is omitted and only a configuration of the Bluetooth device 200 necessary for an exemplary operation of the present invention will be described. Namely, when a Bluetooth connection is established between the Bluetooth device 200 and the Bluetooth headset 100, the Bluetooth device 200 may perform a general Bluetooth communication operation with the Bluetooth headset 100. For example, the Bluetooth device 200 may transmit an audio signal according to playing media data to the Bluetooth headset 100. Further, when the Bluetooth device 200 supports a mobile communication function, it may transmit an audio signal, received based on a voice call from a partner device, to the Bluetooth headset 100, and may transmit an audio signal, received from the Bluetooth headset 100, to the partner device. A detailed description of a general operation and construction based on Bluetooth communication between the Bluetooth device 200 and the Bluetooth headset 100 is omitted for convenience.

Figure 2:
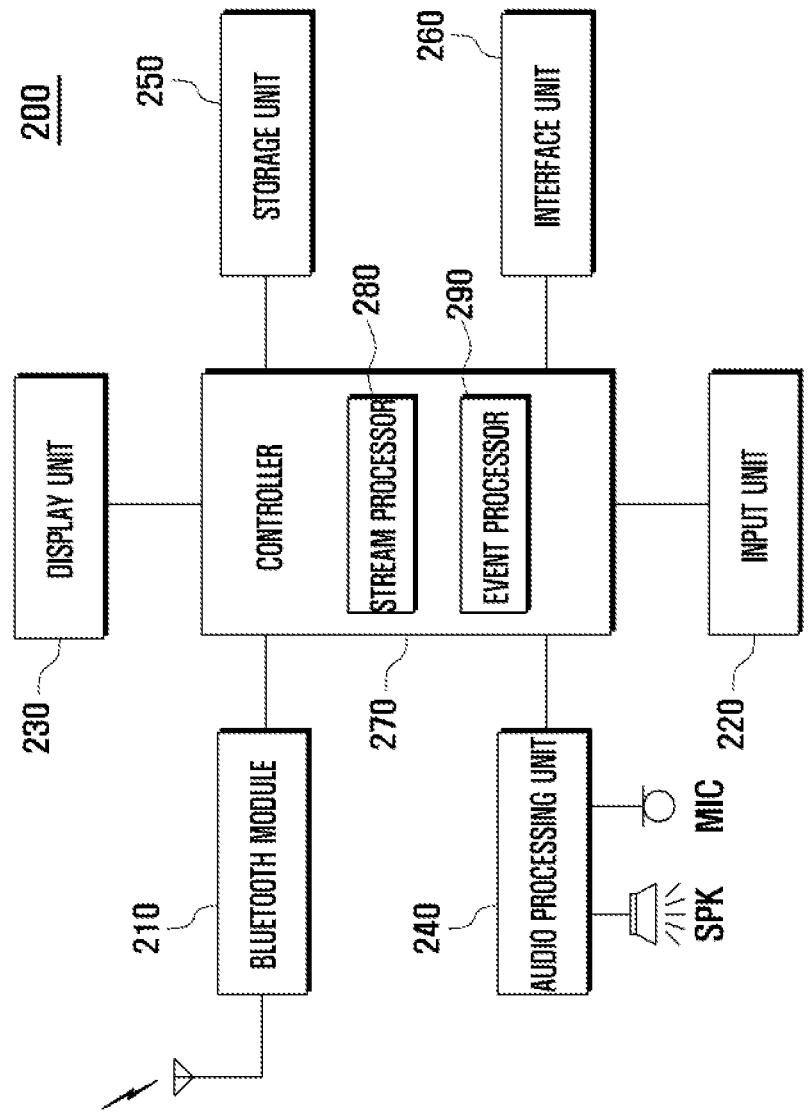
FIG. 2 is a block diagram schematically illustrating a configuration of a Bluetooth device according to an exemplary embodiment of the present invention.

FIG. 2 is a block diagram schematically illustrating a configuration of a Bluetooth device according to an exemplary embodiment of the present invention.

Referring to FIG. 2, the Bluetooth device 200 includes a Bluetooth module 210, an input unit 220, a display unit 230, an audio processing unit 240, a storage unit 250, an interface unit 260, and a controller 270. The audio processing unit 240 may include a speaker (SPK) and a microphone (MIC). The controller 270 includes a stream processor 280 and an event processor 290.

The Bluetooth module 210 supports Bluetooth communication of the Bluetooth device 200. The Bluetooth module 210 forms a Bluetooth communication channel, for example with the Bluetooth headset 100, according to the control of the controller 270 to process transmission and reception of various data signals. The Bluetooth module 210 may perform Bluetooth communication according to Bluetooth protocols with another Bluetooth device through a Bluetooth antenna. The Bluetooth module 210 stores a host stack for processing Bluetooth communication, a Bluetooth profile, and an application selectable according to functions or conditions of an external Bluetooth device that is a communication target. To do this, the Bluetooth module 210 may further include a storage unit, independent of the storage unit 250 of the Bluetooth device 200. In another exemplary embodiment, the Bluetooth module 210 may store the host stack, Bluetooth profile, and selectable application in the storage unit 250. The Bluetooth profile may selectively use HFP supporting hands free operation, HSP supporting headset operation, or Cordless Telephone Profile (CTP) supporting wireless telephone operation according to an external Bluetooth device.

More particularly, the Bluetooth module 210 may receive an AVRCP based control signal from the Bluetooth headset 100 while in a media streaming connection state with the Bluetooth headset 100. When the Bluetooth module 210 is not in a media streaming connection state with the Bluetooth headset 100, it periodically transmits virtual media stream data to the Bluetooth headset 100 under the control of the controller 270. Accordingly, a virtual media streaming connection state is formed between the Bluetooth device 200 and the Bluetooth headset 100, and the Bluetooth module 210 may receive an AVRCP based control event from the Bluetooth headset 100.

The input unit 220 sends an input signal for inputting any of various numbers and character information, and an input signal associated with setting and control of respective functions of the Bluetooth device 200 to the controller 270. The input unit 220 includes an input key for inputting an input signal of the Bluetooth device 200 and function keys. The function keys may include arrow keys, side keys, and hot keys (e.g., a key capable of activating a Bluetooth function) set to execute specific functions. The input unit 220 can be configured by a touch pad, a touch screen, a key pad of general key arrangement, a Qwerty key pad, and a combination thereof according to a providing pattern of the Bluetooth device 200. More particularly, the input unit 220 may generate and provide an input signal corresponding to a menu selection associated with a Bluetooth communication function and a Bluetooth communication connection request to the controller 270. The input signal can be generated in one of a key signal according to operation of the input unit 220 or a touch signal according to contact of the touch screen.

The display unit 230 outputs a screen activated according to an executed function of the Bluetooth device 200. For example, the display unit 230 may output a boot screen, an idle screen, a menu screen, a list screen, a media data play screen, an application execution screen, a Bluetooth communication screen, and the like. Namely, the display unit 230 may display all kinds of screens associated with a state and an operation of the Bluetooth device 200. An LCD, an OLED, and the like are applicable as the display unit 230. Further, the display unit 320 can be implemented in a touch screen scheme. In this case, the display unit may simultaneously perform input and output functions. When the display unit 230 is implemented as a touch screen to perform an input function, the input unit 200 can be omitted according to a form of the Bluetooth device 200. The display unit 230 may display a menu screen and a peripheral device searching screen associated with a Bluetooth connection of the Bluetooth device 200 under the control of the controller 270.

The audio processing unit 240 may include a speaker (SPK) for playing an audio signal of the Bluetooth device 200, and a microphone (MIC) for collecting an audio signal such as a user's voice. The audio processing unit 240 converts an audio signal received from the microphone into data, and outputs the data to the controller 270. The audio processing unit 240 outputs an audio signal input from the controller 270 through the speaker. In addition, the audio processing unit 240 may output various audio components (e.g., audio signal according to playing of media data, audio signal for effect alarm at the time of executing a function, and the like) generated in the Bluetooth device 200 according to a user's selection.

The storage unit 250 stores various data generated and used in the Bluetooth device 200. The data includes data (e.g., media data, broadcasting data, photograph data, message data, document data, menu data, and the like) generated according to a function executed by the Bluetooth device 200, all types of storage data generated using the Bluetooth device 200 or received from an external device (e.g., external device, PC, Bluetooth headset, and the like), and applications for direct execution of corresponding function/menu set among support functions of the Bluetooth device 200. Moreover, the storage unit 250 may store software associated with a remote control function of the Bluetooth device 200 supported by the present invention. The storage unit 250 may also store various sets of information associated with Bluetooth communication of the Bluetooth device 200. The various sets of information may contain information used for determining a Bluetooth execution mode, identification information, and a mapping table mapped to an internal control event corresponding to BD_ADDR and AVRCP control events.

Furthermore, the storage unit 250 may include at least one buffer for temporarily storing data created during function execution of the Bluetooth device 200. For example, the storage unit 250 may buffer virtual media stream data generated under the control of the controller 270. The storage unit 250 may be configured either internally or externally of the Bluetooth device 200. For example, the storage unit 250 may be configured as a smart card and may include all internal/external storage media of the device. The storage unit 250 may include a Random Access Memory (RAM), a Read Only Memory (ROM), a flash memory, and the like. The storage unit 250 can be configured by a RAM, a ROM, a flash memory, an integrated memory, a plurality of integrated memories like a Multi Chip Package (MCP) memory, and the like.

The interface unit 260 supports access through wired or wireless communication with the external output device 300. The interface unit 260 provides image data, according to control of the controller 270, to the external output device 300 based on a set scheme such as the wired or wireless communication. For example, the interface unit 260 may access a TV being the external output device 300 based on the set communication scheme (e.g., wired communication scheme) by a TV-OUT function of the Bluetooth device 200, and provide operation data to the TV under the control of the controller 270.

According to an exemplary embodiment of the present invention, the configuration of the interface unit 260 can be omitted according to the external output function of the Bluetooth device 200. Furthermore, when the Bluetooth device 200 includes a projector module which supports the external output function, the configuration of the interface unit 260 can be omitted. The projector module can be embedded in the Bluetooth device 200, and indicates a module for enlarging various image data that are provided from the controller 270 through the lens and supporting the output of the external screen. That is, the projector module can project a screen of various data processed in the controller 270 to the external screen without distortion. The controller 270 performs overall control for the Bluetooth device 200, and controls the signal flow between each configuration in the Bluetooth device 200. The controller 270 controls the signal flow between each configuration such as the Bluetooth module 210, the input unit 220, the display unit 230, the audio processing unit 240, the storage 250, and the interface unit 260.

The controller 270 controls a series of operations relating to the Bluetooth headset 100 and Bluetooth communication. For example, the controller 270 can control the pairing procedure according to the Bluetooth connection between the Bluetooth device 200 and the Bluetooth headset 100. Moreover, when the Bluetooth connection is established between the Bluetooth device 200 and Bluetooth headset 100, the controller 270 supports the Bluetooth communications based on the Bluetooth headset 100 and the HFP, and the Bluetooth communications based on A2DP and AVRCP.

When the Bluetooth device 200 supports the mobile communications service and includes corresponding elements, the HFP based Bluetooth communication indicates a communication performed with the Bluetooth headset 100 in a call mode. For example, the HFP based Bluetooth communication indicates the Bluetooth communication sending an audio signal, such as a voice sent from another device, to the Bluetooth headset 100, and receiving the audio signal such as the voice from the Bluetooth headset 100. And, in the HFP based Bluetooth communication, the Bluetooth device 200 can receive a control signal controlling the function (e.g., volume adjustment) according to the execution of a call mode from the Bluetooth headset 100. The A2DP and AVRCP based Bluetooth communication indicates the communications performed with the Bluetooth headset 100 by the Bluetooth device 200 in a play mode of specific media data.

For example, the Bluetooth device 200 can transmit media stream data, corresponding to the playing of media data, to the Bluetooth headset 100 under the control of the controller 270 when the media data is played in a state where the Bluetooth connection is set with the Bluetooth headset 100. Thus, a media streaming connection is established between the Bluetooth device 200 and the Bluetooth headset 100. And, the Bluetooth headset 100 and the Bluetooth device 200 can send and receive the AVRCP based control signal in a state in which a media streaming connection is established. That is, in the A2DP and AVRCP based Bluetooth communications, the Bluetooth device 200 can receive a control signal controlling the media data play related function from the Bluetooth headset 100.

In the related art, in a case in which the Bluetooth device 200 executes another mode (for example, a mode according to the execution of album application) that is not a mode for playing or otherwise executing media data, the AVRCP based control signal generated in the Bluetooth headset 100 is ignored in the Bluetooth device 200. Therefore, a controller 270, according to an exemplary implementation of the present invention, generates virtual media stream data when the Bluetooth device 200 and the Bluetooth headset 100 enter the other mode due to an execution of a specific application in the state in which the Bluetooth connection is established between the Bluetooth device 200 and the Bluetooth headset 100. The controller 270 controls the setting of a virtual media streaming connection between the Bluetooth device 200 and the Bluetooth headset 100 by periodically transmitting the generated virtual media stream data to the Bluetooth headset 100.

Thereafter, in the state where the virtual media streaming connection is established, the controller 270 does not ignore the AVRCP based control signal generated in the Bluetooth headset 100 but processes it as a normal control event to control the application according to the other mode. The controller 270 performs control of overall operations relating to the generation of virtual media stream data of the present invention as described in FIG. 1 to FIG. 3 and FIG. 4 to FIG. 6, the generated virtual media stream data based virtual media streaming connection setting, and the operation of the function of the Bluetooth device 200 according to the control event received after the virtual media streaming connection.

The control event indicates an AVRCP event based on the AVRCP with a remote control signal received from the Bluetooth headset 100 in a state of virtual audio streaming connection. A series of control functions of the controller 270 as described above can be implemented as software having a given algorithm for a corresponding function control and controlled. The controller 270 may include the stream processor 280 and the event processor 290. When the Bluetooth device 200 executes a specific application that does not generate media stream data, the stream processor 280 processes a generation of virtual media stream data. The stream processor 280 controls to transmit the generated virtual media stream data to the Bluetooth headset 100 according to a preset period.

The stream processor 280 sets the virtual media streaming connection with the Bluetooth headset 100 through a periodic transmission of the virtual media stream data and provides corresponding information to the event processor 290. In more detail, the stream processor 280 corresponds to a virtual media stream generator supporting the generation of virtual media stream data of the Bluetooth device 200. An exemplary stream processor 280 is illustrated in FIG. 3 below.

Figure 3:
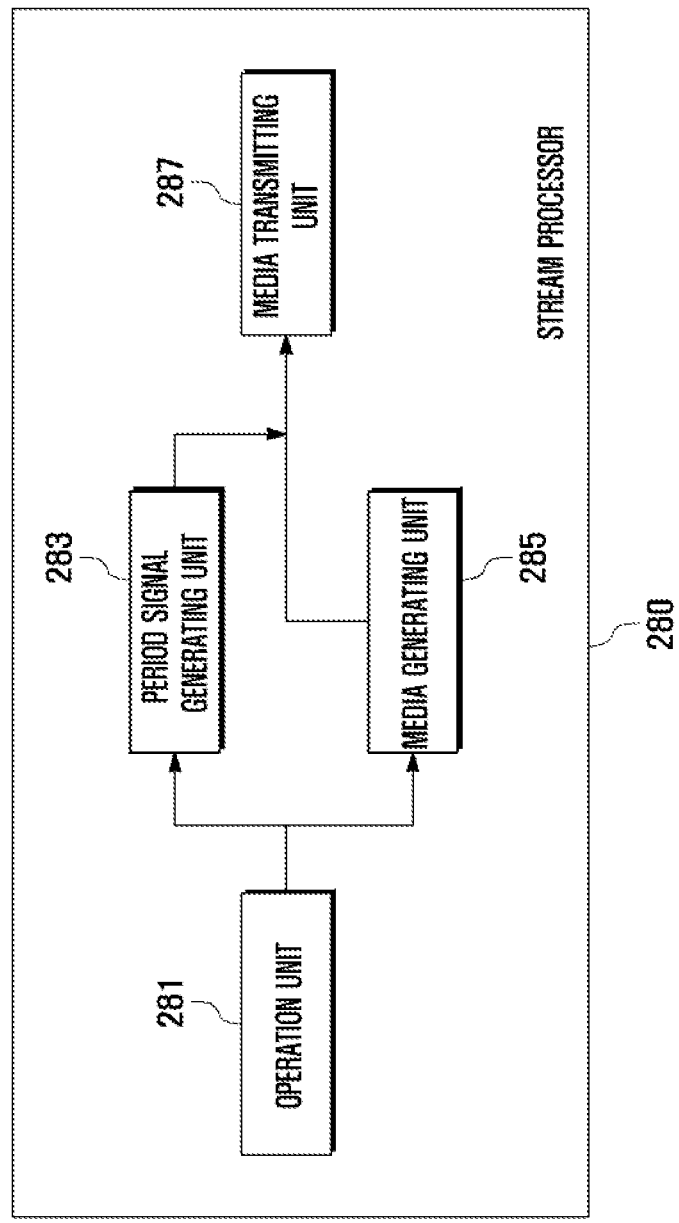
FIG. 3 is a block diagram schematically illustrating a configuration of a stream processor according to an exemplary embodiment of the present invention.

FIG. 3 is a block diagram schematically illustrating a configuration of a stream processor according to an exemplary embodiment of the present invention.

Referring to FIG. 3, the stream processor 280 may include an operation unit 281, a period signal generating unit 283, a media generating unit 285, and a media transmission unit 287. If the media attribute information indicating the media support characteristic of the Bluetooth device 200 is input, the stream processor 280 sends the media attribute information to the operation unit 281. Here, the media attribute information indicates at least one of the Bluetooth channel type (mono/stereo), the bit rate, the sample rate, the media frame length, and the like. This media attribute information can be provided by the controller 270 when the Bluetooth device 200 executes a specific application which does not generate media stream data.

The operation unit 281 produces operation information based on the input media attribute information. In more detail, the operation unit 281 produces period information, media data frame header information, and frame size information for transmitting virtual media stream data based on the media attribute information to the Bluetooth headset 100. The operation unit 281 sends the period information to the period signal generating unit 283, and sends the frame header information and the frame size information to the media generating unit 285. The period signal generating unit 283 periodically generates a period signal according to the period information sent from the operation unit 281.

The media generating unit 285 generates a memory buffer for storing as much data as the frame size based on the frame size information sent from the operation unit 281. The media generating unit 285 buffers data by utilizing the buffer and copies the frame header information that is sent from the operation unit 281. The media generating unit 285 generates the media data frame, i.e., the virtual media stream data of the present invention, based on filling in the remaining portion except the header section of data (for example, payload portion) with null data. Thereafter, according to the period signal which is generated in the period signal generating unit 283, the media generating unit 285 sends the generated media data frame to the media transmission unit 287.

The media transmission unit 287 sends the media data frame which is sent according to the period signal of the period signal generating unit 283 in the media generating unit 289, to the Bluetooth module 210. That is, the media transmission unit 287 sends the media data frame based virtual media stream data to the Bluetooth headset 100 through the Bluetooth module 210.

Referring again to FIG. 2, in the state where the virtual media streaming connection is established, the event processor 290 processes the function of the Bluetooth device 200 based on the control event received from the Bluetooth headset 100. When the control event is received, the event processor 290 extracts an internal control event with reference to the mapping table stored in the storage 250. The event processor 290 processes the internal control event based function of the Bluetooth device 200. The function of the stream processor 280 and the event processor 290 can be implemented by software and can be loaded in the controller 270. That is, the controller 270 can control the function of the stream processor 280 and the event processor 290.

In the meantime, in FIG. 2, for the sake of convenience in illustration, a schematic configuration of the Bluetooth device 200 was illustrated. However, the Bluetooth device 200 is not limited to the above-described configuration. For example, the controller 270 can include a baseband module for the mobile communications service of the Bluetooth device 200. In this case, the Bluetooth device 200 can further include a wireless communications module.

Moreover, although not shown in FIG. 2, the Bluetooth device 200 may include configurations, which are not mentioned in FIG. 2, such as a projector module for the support of projection function, a Global Position System (GPS) for acquiring location information, a camera module for taking a picture of static images/moving picture of a subject, respective interface units for transmitting and receiving data by a wired or wireless communications method of the Bluetooth device 200, an internet communications module communicating with the internet network and performing the internet function, and a digital broadcasting module for receiving and playing of a digital broadcast.

The modification of these elements is too various to enumerate due to the convergence trend of digital devices. However, an element equivalent to the above mentioned elements can be further included in the Bluetooth device 200. Moreover, it is obvious that, in an exemplary Bluetooth device of the present invention, a specific configuration may be excluded from the configuration of FIG. 2 or can be replaced with another configuration. This can be easily understood by a person skilled in the art. Up to now, the configuration of the system which sets the virtual media streaming connection according to an exemplary embodiment of the present invention and can control the Bluetooth device 200 based on this and the Bluetooth device 200 supporting the same was illustrated.

Next, an exemplary method for supporting the function of the present invention in a Bluetooth device is illustrated with reference to FIG. 4 to FIG. 6. However, the operation of the present invention is not limited to the following description.

Figure 4:
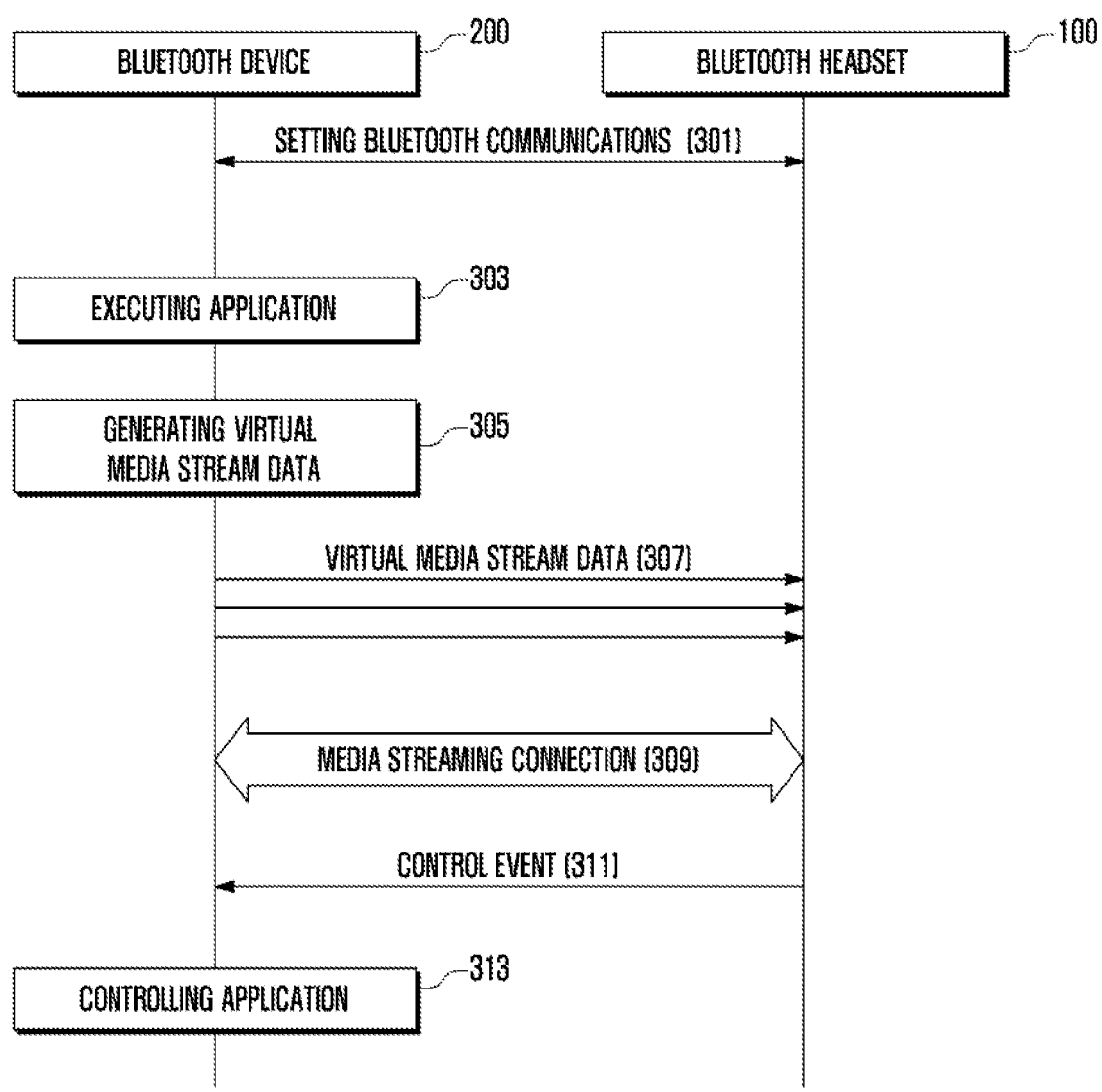
FIG. 4 is a drawing illustrating a remote control operation of a Bluetooth device in a system according to an exemplary embodiment of the present invention.

FIG. 4 is a drawing illustrating a remote control operation of a Bluetooth device in a system according to an exemplary embodiment of the present invention.

Referring to FIG. 4, the Bluetooth connection for the Bluetooth communications can be established between the Bluetooth device 200 and the Bluetooth headset 100 by a general pairing procedure in step 301. The Bluetooth device 200 can execute a specific application corresponding to a user's request in step 303. For example, the controller 270 of the Bluetooth device 200 may execute an application corresponding to a user's execution request and control a corresponding screen display. At this time, the application may correspond to an application that does not generate a media streaming operation.

The Bluetooth device 200 generates virtual media stream data when the application is executed in step 305. At this time, the controller 270 of the Bluetooth device 200 can classify whether it is an application executing without the media streaming function or whether it is an application executing with the media streaming function. The controller 270 can control the generation of the virtual media stream data based on the result of the classification. For example, the controller 270 of the Bluetooth device 200 analyzes a type of the executed application. When the type of the application is an application that plays or otherwise executes media data, the controller 270 of the Bluetooth device 200 recognizes this as a streaming mode in which the media streaming function exists. That is, the media streaming connection state is automatically accomplished based on the A2DP. In this case, the controller 270 can omit the process of generating the virtual media stream data.

On the other hand, when the type of the application is another mode based application that does not play or otherwise execute media data, the controller 270 of the Bluetooth device 200 recognizes this as a non-streaming mode in which the media streaming function does not exist. That is, the media streaming connection state is not accomplished based on the A2SP. In this case, the controller 270 controls the generation of the virtual media stream data.

The Bluetooth device 200 transmits the generated virtual media stream data to the Bluetooth headset 100 in step 307. The controller 270 of the Bluetooth device 200 can control to transmit the generated virtual media stream data by a preset period. More particularly, a suitable period value can be preset for the Bluetooth device 200 according to the Bluetooth support characteristic (for example, the media stream sampling period, the use frequency band, and the like). And the controller 270 can control the periodic transmission of the generated virtual media stream data based on the preset period value.

At this time, the virtual media stream data can be generated as null data. Furthermore, the generated null data may be buffered in the buffer of the storage 250 and the controller 270 may control to transmit the buffered null data to the Bluetooth headset 100 according to the period. The Bluetooth device 200 can set a virtual media streaming connection with the Bluetooth headset 100 through the virtual media stream data transmission in step 309. Accordingly, the controller 270 of the Bluetooth device 200 does not ignore the control signal sent from the Bluetooth headset 100 in the media streaming connection state, but can process it as a control event of the present invention.

The Bluetooth headset 100 transmits a control event generated by a button input of the user to the Bluetooth device 200 in step 311. For example, the user can generate an input using a button to which a command for a certain function control is allocated based on the input unit equipped in the Bluetooth headset 100. Based on the input button, the controller of the Bluetooth headset 100 determines an input signal and generates a control event for the transmission of a corresponding function control command. The controller of the Bluetooth headset 100 transmits the generated control event to the Bluetooth device 200 based on the AVRCP. When the Bluetooth device 200 receives the control event from the Bluetooth headset 100, it controls the application which was executed at step 303 based on the control event in step 313.

That is, the controller 270 of the Bluetooth device 200 receives the AVRCP based control event of the Bluetooth headset 100 through the virtual media stream. The controller 270 performs control of the application by processing and converting the control event into a corresponding internal control event for the application being executed by the Bluetooth device 200.

Figure 5:
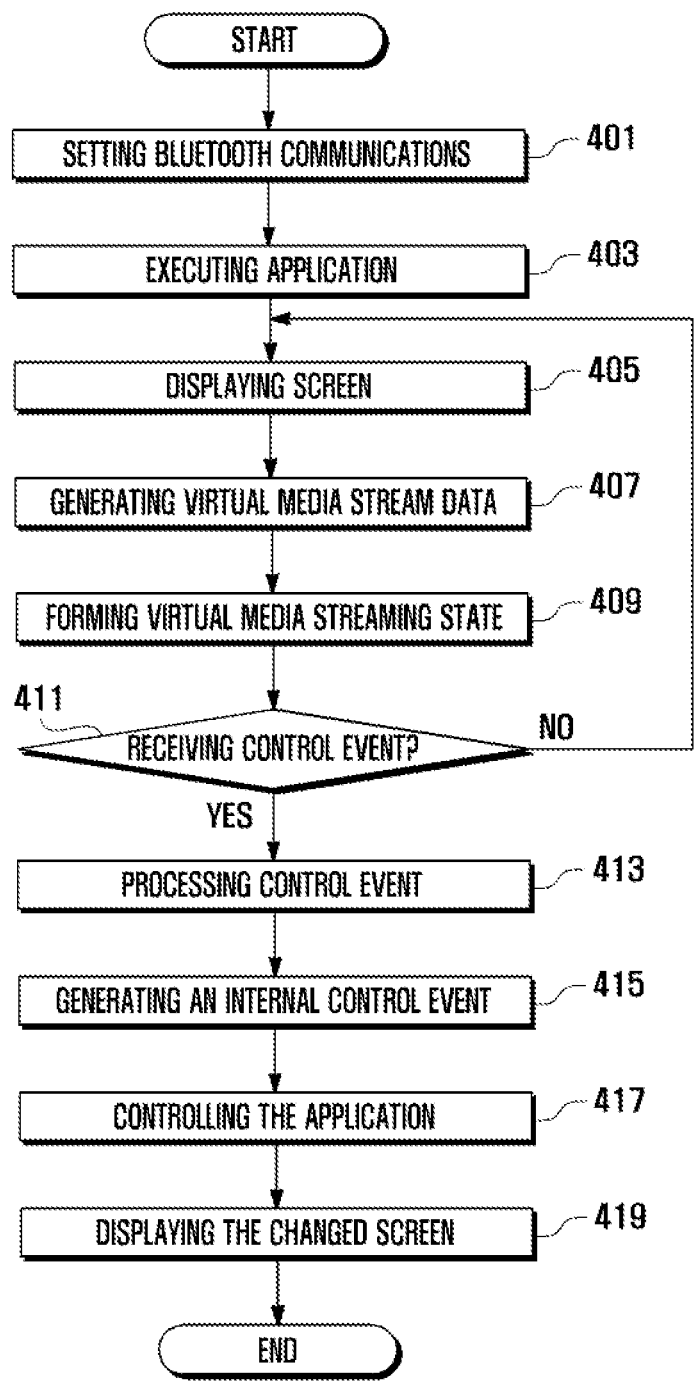
FIG. 5 is a drawing illustrating an operating method for remote control of a Bluetooth device according to an exemplary embodiment of the present invention.

FIG. 5 is a drawing illustrating an operating method for remote control of a Bluetooth device according to an exemplary embodiment of the present invention.

Referring to FIG. 5, the controller 270 of the Bluetooth device 200 sets a Bluetooth connection for Bluetooth communication with the Bluetooth headset 100 in response to a user's request in step 401. The controller 270 can set the Bluetooth connection by controlling the general Bluetooth communications connection procedure, e.g., the pairing procedure. More particularly, in an exemplary embodiment of the present invention, a protocol for the Bluetooth communication is used based on the A2DP and the AVRCP. Therefore, the Bluetooth headset 100 indicates the Bluetooth stereo headset which supports the RCP function with respect to the media stream data by using the A2DP and the AVRCP.

The controller 270 of the Bluetooth device 200 executes a specific application corresponding to the user's request in step 403, and controls to display a screen of the executed application on the display unit 230 in step 405.

Here, the application executed at step 403 can be an application that does not require a media streaming operation such as an album application, a document viewing application, and the like. The album application may display a list of photos and provide a function such as changing between photos in the list, enlargement of a specific photo, viewing the list of photos as a slide show, and the like. Similarly, the document viewing application may provide a function for viewing specific document data and a function for changing between the pages of document data displayed by the view function, the presentation, and the continuous view.

In step 407, the controller 270 of the Bluetooth device 200 generates virtual media stream data at the point in time of executing the application at step 403. Also, the controller 270 forms a virtual media streaming connection between the Bluetooth device 200 and the Bluetooth headset 100 based on the generated virtual media stream data in step 409.

In more detail, the controller 270 can form the virtual media streaming connection with the Bluetooth headset 100 by controlling a periodic transmission of the generated virtual media stream data to the Bluetooth headset 100 according to a preset period. At this time, the controller 270 can complete the generation of virtual media stream data and the connection of the virtual media streaming at the point in time of executing the application and can process the executed application based screen display. Also, the controller 270 can continuously control to transmit the generated virtual media stream data according to a preset period after the display of the screen.

The controller 270 of the Bluetooth device 200 can determine if a control event is received from the Bluetooth headset 100 in the state of the virtual media streaming connection in step 411.

The control event indicates the AVRCP based event. For example, when the Bluetooth headset 100 includes an input unit which has three buttons, a control signal corresponding to a function such as previous track play, next track play, pause, play, fast forward, and rewind, can be generated according to the user's input based on the three buttons. The Bluetooth headset 100 transmits the generated control signal to the Bluetooth device 200 based on the AVRCP. The controller 270 recognizes the control signal as the control event of the present invention when receiving the control signal from the Bluetooth headset 100 in the state of the virtual media streaming connection. When it is determined in step 411 that a control event is not received, the controller 270 of the Bluetooth device 200 returns to step 405 and can repeatedly execute the following procedures.

On the other hand, when it is determined in step 411 that a control event is received, the controller 270 processes the control event in step 413, and generates an internal control event for functional control of the Bluetooth device 200 in step 415. For example, the controller 270 can convert the control event into the internal control event with reference to a mapping table in which the internal control event is mapped and classified by the control event of the Bluetooth headset 100. As an example, the internal control event may correspond to an event for controlling movement of a previous page (or photo data), movement of a next page (or photo data), continuously view data, presenting document data (or photo data) based on the executed application, and the like.

The controller 270 of the Bluetooth device 200 controls the function of the execution application based on the generated internal control event in step 417, to display the application based change screen which is changed according to the control to the display unit 230 in step 419. When the Bluetooth device 200 outputs the application based screen to the external output device 300 by the external output function, or outputs the application based screen to the external screen based on the projector module of the Bluetooth device 200, the controller 270 also controls its output function. Up to now, it was illustrated that the Bluetooth device 200 according to an exemplary embodiment of the present invention generates a virtual media stream data, forms a virtual media streaming connection with the Bluetooth headset 100 based on this, and remotely controls the function of the Bluetooth device 200 according to the AVRCP based control event sent from the Bluetooth headset 100. Next, an exemplary method for generating virtual media stream data is illustrated with reference to FIG. 6.

Figure 6:
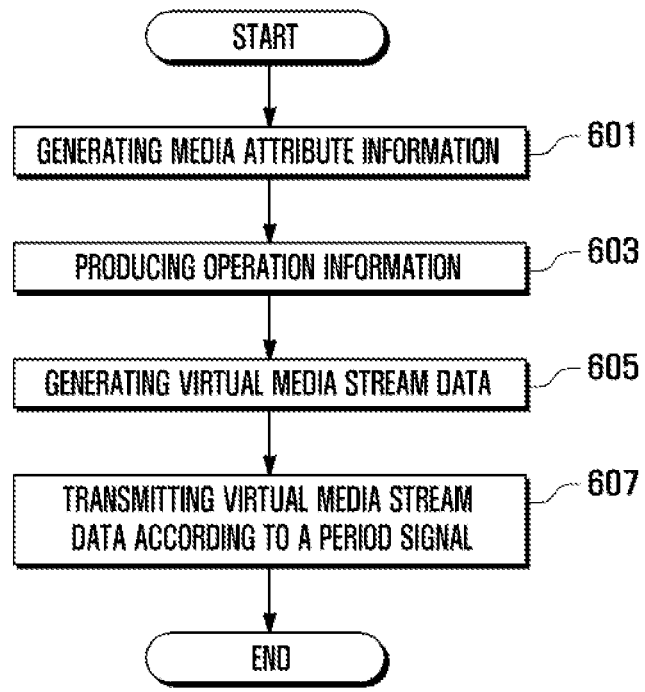
FIG. 6 is a drawing illustrating a method for generating virtual media stream data in a Bluetooth device according to an exemplary embodiment of the present invention.

FIG. 6 is a drawing illustrating a method for generating virtual media stream data in a Bluetooth device according to an exemplary embodiment of the present invention.

Referring to FIG. 6, the controller 270 of the Bluetooth device 200 generates media attribute information when executing a specific application that does not generate media stream data in step 601. The media attribute information may include at least one of the Bluetooth channel type (mono/stereo), the bit rate, the sample rate, and the media frame length. The controller 270 produces operation information based on the generated media attribute information in step 603. The operation information may include period information regarding transmission to the Bluetooth headset 100, media data frame header information and frame size information. In step 605, the controller 270 of the Bluetooth device 200 generates media data frame, that is, virtual media stream data based on the produced operation information.

In more detail, the controller 270 buffers data by using the buffer for storing as much data as a frame size based on the frame size information among the produced operation information. Also, the controller 270 copies into the header of the buffering data by using the frame header information among the operation information. Moreover, the controller 270 fills in the remaining portion excluding the header section of the data with null data and generates the media data frame. That is, the virtual media stream data is generated. In step 607, the controller 270 of the Bluetooth device 200 controls a periodic transmission of the generated media data frame according to a period signal that is generated based on the period information among the operation information.

As described above, exemplary embodiments of the present invention can set a virtual media streaming connection between the Bluetooth device 200 and the Bluetooth headset 100 through a periodic transmission of generated media data frames after generating the media data frame. Accordingly, the controller 270 of the Bluetooth device 200 recognizes the AVRCP based control signal sent from the Bluetooth headset 100 as a control event and processes the control for execution of an application based on the control event. As described above, the exemplary remote control method and apparatus of the Bluetooth device suggested in the present invention can support the AVRCP based remote control with respect to all execution applications of the Bluetooth devices through the virtual media streaming connection between the Bluetooth device and the Bluetooth stereo headset. Hence, according to exemplary embodiments of the present invention, the Bluetooth device can remotely-control the execution of an application of the Bluetooth device by using the Bluetooth stereo headset during the execution of an application that does not perform a media streaming operation such as audio streaming or video streaming. Moreover, according to exemplary embodiments of the present invention, a user can easily remotely control a screen change by using the Bluetooth stereo headset when executing a presentation function by using a screen output function, and accordingly, can improve the convenience of the user in the presentation using the Bluetooth device.

The above-described exemplary methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of remotely controlling a Bluetooth device, the method comprising:
   establishing a Bluetooth connection with a Bluetooth headset;
   generating virtual media stream data when executing an application that does not require a media streaming operation;
   transmitting the generated virtual media stream data to the Bluetooth headset according to a preset period;
   establishing a virtual media streaming connection with the Bluetooth headset based on the generated virtual media stream data;
   recognizing a control signal received from the Bluetooth headset as a control event after the establishing of the virtual media streaming connection; and controlling a function of the executed application according to the control event; and
   processing the control signal received in a state of the virtual media streaming connection as an Audio Video Remote Control Profile (AVRCP) based control event.

2. The method of claim 1, wherein the generating of the virtual media stream data comprises:
   generating media attribute information when executing a specific application that does not generate media stream data;
   producing operation information based on the generated media attribute information; and
   generating the virtual media stream data based on the produced operation information.

3. The method of claim 2, wherein the media attribute information comprises at least one of a Bluetooth channel type, a bit rate, a sample rate, and a media frame length, and wherein the operation information comprises at least one of period information, media data frame header information, and frame size information.

4. The method of claim 3, wherein the generating of the virtual media stream data comprises:
   buffering data by using a buffer for storing as much data as a frame size based on the frame size information among the operation information;
   copying into a header of the buffered data by using the frame header information among the operation information; and
   filling a remaining portion excluding the header section of the buffered data with null data and generating the virtual media stream data.

5. The method of claim 4, wherein the establishing of the virtual media streaming connection comprises periodically transmitting the generated virtual media stream data to the Bluetooth headset according to a period signal generated based on the period information among the operation information.

6. The method of claim 2, wherein the recognizing of the control signal comprises processing the control signal as the control event when an Audio Video Remote Control Profile (AVRCP) based control signal is received after the establishing of the virtual media streaming connection.

7. The method of claim 6, wherein the controlling of the function of the executed application comprises:
generating the control event as an internal control event based on a mapping table in which the internal control event is mapped and classified by control event; and
controlling the function of the executed application based on the internal control event.

8. The method of claim 2, wherein the generating of the virtual media stream data comprises:
analyzing a type of the application during the execution of the application; and
generating the virtual media stream data when the application type is an application that does not perform the media stream data based media streaming operation.

9. The method of claim 1, further comprising:
displaying a first screen corresponding to the executed application; and
displaying a second screen corresponding to the executed application after receipt of the control signal.

10. A Bluetooth device, the device comprising:
a Bluetooth module for establishing a Bluetooth connection with a Bluetooth headset; and
a controller for generating virtual media stream data when executing an application that does not require a media streaming operation, for transmitting the generated virtual media stream data to the Bluetooth headset according to a preset period, for establishing a virtual media streaming connection with the Bluetooth headset based on the generated virtual media stream data, and for processing a control signal received in a state of the virtual media streaming connection as an Audio Video Remote Control Profile (AVRCP) based control event.

11. The Bluetooth device of claim 10, wherein the controller generates the virtual media stream data when an application type is an application that does not perform the media stream data based media streaming operation.

12. The Bluetooth device of claim 11, wherein the controller controls to periodically transmit the generated virtual media stream data to the Bluetooth headset according to a preset period.

13. The Bluetooth device of claim 11, wherein the controller generates the control event as an internal control event based on a mapping table in which the internal control event is mapped and classified by control event, and controls a function of the executed application based on the internal control event.

14. The Bluetooth device of claim 11, wherein the controller comprises:
a stream processor for processing the generation of the virtual media stream data when executing a specific application that does not generate media stream data in the Bluetooth device, and for setting the virtual media streaming connection through the transmission of the generated virtual media stream data; and
an event processor for processing the function of the executed application based on the control event received from the Bluetooth headset in the state where the virtual media streaming connection is accomplished.

15. The Bluetooth device of claim 14, wherein the event processor extracts an internal control event with reference to a preset mapping table when the control event is received, and processes a function control of the application based on the internal control event.

16. The Bluetooth device of claim 14, wherein the controller generates media attribute information including at least one of a channel type, a bit rate, a sample rate, and a media frame length, when executing a specific application that does not generate media stream data.

17. The Bluetooth device of claim 16, wherein the stream processor comprises:
an operation unit for producing operation information including at least one of period information, media data frame header information, and frame size information based on the media attribute information;
a period signal generating unit for generating a period signal according to the period information determined in the operation unit; and
a media generating unit for generating the virtual media stream data based on the media data frame header information and the frame size information produced in the operation unit.

18. The Bluetooth device of claim 17, wherein the media generating unit buffers as much data as a frame size based on the frame size information, copies the frame header information sent from the operation unit into the header of buffered data, and fills a remaining portion excluding the header section of the buffered data with null data and generates the virtual media stream data.

19. The Bluetooth device of claim 18, wherein the stream processor comprises a media transmission unit for sending the virtual media stream data sent from the media generating unit according to the period signal of the period signal generating unit to the Bluetooth module.

20. The Bluetooth device of claim 10, further comprising a display unit for displaying a first screen corresponding to the executed application, and for displaying a second screen corresponding to the executed application after receipt of the control signal.

* * * * *